United States Patent
Fosdike et al.

(10) Patent No.: US 11,872,974 B2
(45) Date of Patent: Jan. 16, 2024

(54) BRAKE CONTROLLER FOR A TOWED VEHICLE WITH COMBINED BRAKE AND TURN LIGHTS

(71) Applicant: Redarc Technologies Pty Ltd., Morphett Vale (AU)

(72) Inventors: Timothy Fosdike, Torrens Park (AU); Nathan Kuchel, Morphett Vale (AU)

(73) Assignee: Redarc Technologies Pty Ltd., Morphett Vale (AU)

( * ) Notice: Subject to any disclaimer, the term of this patent is extended or adjusted under 35 U.S.C. 154(b) by 120 days.

(21) Appl. No.: 17/489,420

(22) Filed: Sep. 29, 2021

(65) Prior Publication Data

US 2022/0105913 A1  Apr. 7, 2022

Related U.S. Application Data

(60) Provisional application No. 63/086,203, filed on Oct. 1, 2020.

(51) Int. Cl.

| | | |
|---|---|---|
| G05D 1/00 | (2006.01) | |
| B60T 8/58 | (2006.01) | |
| B60T 8/17 | (2006.01) | |
| B60T 7/20 | (2006.01) | |
| B60T 8/172 | (2006.01) | |
| B60T 8/171 | (2006.01) | |
| B60T 8/174 | (2006.01) | |
| B60Q 1/34 | (2006.01) | |
| B60Q 1/44 | (2006.01) | |

(52) U.S. Cl.
CPC ............. *B60T 8/58* (2013.01); *B60T 7/20* (2013.01); *B60T 8/1701* (2013.01); *B60T 8/171* (2013.01); *B60T 8/172* (2013.01); *B60T 8/174* (2013.01); *B60Q 1/34* (2013.01); *B60Q 1/44* (2013.01); *B60T 2250/00* (2013.01)

(58) Field of Classification Search
CPC . B60T 8/58; B60T 7/20; B60T 8/1701; B60T 8/171; B60T 8/172; B60T 8/174; B60T 2250/00; B60T 8/1708; B60Q 1/34; B60Q 1/44; G05D 1/00
USPC ............................................................ 701/7
See application file for complete search history.

(56) References Cited

U.S. PATENT DOCUMENTS

| | | | | |
|---|---|---|---|---|
| 9,846,977 | B1 * | 12/2017 | Cox ...................... | G07C 5/085 |
| 2005/0006952 | A1 * | 1/2005 | Kohler .................. | B60D 1/065 |
| | | | | 188/1.11 R |
| 2006/0214506 | A1 * | 9/2006 | Albright ................ | B60T 7/20 |
| | | | | 303/123 |
| 2008/0296968 | A1 * | 12/2008 | Culbert ................ | B60T 8/1708 |
| | | | | 303/20 |
| 2008/0309156 | A1 * | 12/2008 | Kissel ..................... | B60T 7/20 |
| | | | | 701/70 |
| 2011/0320090 | A1 * | 12/2011 | Barthomeuf .......... | B60W 40/12 |
| | | | | 701/42 |
| 2014/0001730 | A1 * | 1/2014 | Kulkarni ................ | B60Q 11/00 |
| | | | | 280/422 |
| 2014/0247005 | A1 * | 9/2014 | Graham ................ | H02J 7/342 |
| | | | | 320/162 |

(Continued)

*Primary Examiner* — Shardul D Patel
(74) *Attorney, Agent, or Firm* — Fish & Richardson P.C.

(57) ABSTRACT

The present invention relates to a brake controller for a towed vehicle braking system and a method of operating a brake controller, wherein the towed vehicle has combined brake and turn lights activated by combined light signals from a towing vehicle.

25 Claims, 6 Drawing Sheets

(56) References Cited

U.S. PATENT DOCUMENTS

| | | | |
|---|---|---|---|
| 2018/0079375 A1* | 3/2018 | Cekola | B60Q 1/0094 |
| 2018/0204396 A1* | 7/2018 | Cox | G07C 5/085 |
| 2020/0125095 A1* | 4/2020 | Lengsfeld | G05D 1/0246 |
| 2021/0049445 A1* | 2/2021 | Bielby | G06N 3/049 |
| 2021/0295134 A1* | 9/2021 | Stevens | G06F 5/01 |

* cited by examiner

BRAKE CONTROLLER FOR A TOWED VEHICLE WITH COMBINED BRAKE AND TURN LIGHTS

CROSS-REFERENCE TO RELATED APPLICATIONS

This application claims the benefit under 35 U.S.C. § 119(e) of U.S. Patent Application No. 63/086,203, entitled "BRAKE CONTROLLER FOR A TOWED VEHICLE WITH COMBINED BRAKE AND TURN LIGHTS," filed Oct. 1, 2020. The disclosure of the foregoing application is incorporated herein by reference in its entirety for all purposes.

TECHNICAL FIELD

The present invention relates to a brake controller for a towed vehicle braking system and a method of operating a brake controller, wherein the towed vehicle has combined brake and turn lights activated by combined light signals from a towing vehicle.

Background of Invention

Towed vehicles such as trailers of various classes have different braking systems. Commonly, trailers with weights between 750 kg and 4.5 tons have electromagnetic braking systems or hydraulic braking systems controlled by electromagnetic actuators. For both of these systems, the braking of the trailer is controlled by an electrical signal from a towing vehicle.

Brake controllers may be used to generate the electrical signal to better control operation of the towed vehicles braking systems. For example, an existing type of brake controller is mounted in the towing vehicle and hardwired into the towing vehicle wiring system so as to receive a braking signal from the towing vehicle and to subsequently generate an electrical signal instructing the operation of the brakes of the towed vehicle. In another example, another type of existing brake controller is mounted in the towing vehicle and employs a microprocessor and an accelerometer to determine deceleration of the towing vehicle. This brake controller then generates an electrical signal instructing the operation of the brakes of the towed vehicle based on the deceleration. In both examples, the brake controllers can also provide additional instructions on the electrical signal that are indicative of braking force applied to the brakes of the towed vehicle.

Hardwiring of a brake controller into a towing vehicle wiring system, however, is not always possible or convenient. The brake controller wiring, for instance, may not be compatible with the towing vehicle wiring, and may require additional wiring which adds expense and complexity to the installation.

It is also not always desirable to mount a brake controller in the towing vehicle, especially where the interior trim of the towing vehicle may be damaged. Further, brake controllers using an accelerometer are typically required to be mounted in a particular position in the towing vehicle and orientation, which may also not be possible.

Brake controllers may also be mounted on towed vehicles. For towed vehicles, the standards governing the possible wiring connections between a towing vehicle and the towed vehicle includes provision of a separate brake light signal. For example, heavy duty vehicles may use a 7-pin trailer connector according to the ISO1185 and SAE J560 standards, which includes a dedicated pin for a brake light signal. Many towed vehicles, however, especially lighter duty towed vehicles in North America, such as trailers or recreational vehicles, have combined brake and turn lights, and are not governed by these standards. Instead, they are governed by different standards—including SAE J2863—that allow for the combined brake and turn lights to be used. That is, these standards do not provide a separate brake light signal to inform a connected brake controller that the towing vehicle is braking.

A reference herein to a patent document or other matter which is given as prior art is not to be taken as an admission that that document or matter was known or that the information it contains was part of the common general knowledge as at the priority date of any of the disclosure or claims herein. Such discussion of prior art in this specification is included to explain the context of the present invention in terms of the inventor's knowledge and experience.

SUMMARY OF INVENTION

According to one aspect of the present invention there is provided a brake controller for a towed vehicle braking system, wherein the towed vehicle has combined brake and turn lights activated by combined light signals from a towing vehicle, the brake controller including: a microcontroller configured to receive the combined light signals from the towing vehicle and to estimate a likelihood that the towing vehicle is braking based on the combined light signals, wherein the microcontroller is further configured to generate a braking control signal to control activation of brakes of the towed vehicle braking system based on at least in part the estimated likelihood that the towing vehicle is braking.

According to another aspect of the present invention there is provided a method of operating a brake controller for a towed vehicle braking system, wherein the towed vehicle has combined brake and turn lights activated by combined light signals from a towing vehicle, the method including: the brake controller receiving the combined light signals from the towing vehicle; estimating a likelihood that the towing vehicle is braking based on the combined light signals; and generating a braking control signal to control activation of brakes of the towed vehicle braking system based on at least in part the estimated likelihood that the towing vehicle is braking.

Preferably, the microcontroller is configured to receive the combined light signals from a trailer connector on the towing vehicle. The brake controller may be mounted to the towed vehicle or may be mounted to the trailer connector.

Examples of a trailer connector include: a 7-pin trailer connector (e.g. a 7-pin SAE J2863 trailer connector), 6-pin round connector, flat 5-pin connector, and a flat 4-pin connector. These types of trailer connectors all include pins and wires for combined light signals to activate the combined brake and turn lights of the towed vehicle. For example, the 7-pin trailer connector has one pin for a combined left turn/stop lamp signal and one pin for a combined right turn/stop lamp signal.

The microcontroller is able to reliably generate the braking control signal from the combined light signals present on the trailer connector, such as a 7-pin US "Pollak" trailer connector, using this method. For example, in use, a towing vehicle may activate hazard lights on the towed vehicle by repeatedly providing combined left turn/stop lamp signals and combined right turn/stop lamp signals. The microcontroller here is able to reliably estimate the likelihood that the towing vehicle is braking, irrespective of whether the towing vehicle is activating the hazard lights, from the combined light signals.

In an embodiment, the brake controller further includes an accelerometer configured to determine deceleration of the towed or towing vehicle, and the braking control signal is based on the deceleration of the towing vehicle and the likelihood that the towed or towing vehicle is braking. The accelerometer is configured to determine the deceleration of the vehicle on which it is mounted.

In an embodiment, the braking control signal includes an output level used to control braking force of the brakes of the towed vehicle. That is, the output level controls braking intensity of the brakes of the towed vehicle. The braking control signal thus includes information to instruct the brakes of the towed vehicle to be applied and what force to be applied. The output level may be based on the deceleration. Alternatively, or additionally, the output level is based on gain for the braking control signal. Alternatively, or additionally still, the output level is based on the likelihood that the towed vehicle or the towing vehicle is braking.

In an embodiment, the brake controller is associated with a remote head mounted in the towing vehicle remote from the brake controller for controlling the gain for the braking control signal. The remote head may communicate with the brake controller wirelessly or via wires between the remote head in the towing vehicle and the brake controller.

In an embodiment, the output level used to control a full braking force of the brakes of the towed vehicle is not applied when the likelihood that the towing vehicle is braking is below a threshold likelihood. For example, if the threshold likelihood is a 60% likelihood that the towing vehicle is braking, then a partial braking force is applied when the microcontroller estimates a likelihood that the towing vehicle is braking that is less than 60%. When the microcontroller estimates a likelihood that the towing vehicle is braking that is greater than 60%, the full braking force is applied. Further, the output level may be reduced from the full braking force output level as the likelihood that the towing vehicle is braking reduces below the threshold likelihood. For example, a smaller partial force than the one mentioned above is applied when the microcontroller estimates a likelihood that the towing vehicle is braking that is say 50%.

In the towing vehicle, the combined light signals are generated from a plurality of source signal states including one of or a combination of: left-turn signal state; right-turn signal state; hazard signal state; braking signal state; and emergency braking signal state. For example, if the towing vehicle is indicating to turn left at the same time as braking, the combined light signals would be generated from a combination of the left-turn signal state and the braking signal state.

In an embodiment, the microcontroller is configured to: construct a Stochastic Model for the source signal states; estimate a likelihood of each of the source signal states based on the Stochastic Model and the combined light signals; and estimate the likelihood that the towing vehicle is braking based on the likelihood of each of the source signal states. With reference to the above source signal states, the microcontroller is configured to estimate the likelihood that the towing vehicle is braking based on the likelihood of the combined light signals being generated from at least the braking signal state and/or the emergency braking signal state.

In an embodiment, the microcontroller is configured to estimate the likelihood that the towing vehicle is braking based on the likelihood of the braking signal state and/or the emergency braking signal state and additionally, in another embodiment, based on the deceleration of the vehicle.

Preferably, the Stochastic Model is a Hidden Markov Model.

In another embodiment, the microcontroller is further configured to: construct an Artificial Neural Network (ANN) for the plurality of source signal states; estimate a likelihood of each of the source signal states based on the ANN processing the combined light signals; and estimate the likelihood that the towing vehicle is braking based on the likelihood of the source signal states.

In an example, the behaviour of combined light signals, in the form of tail/brake/hazard signals, on a towed vehicle are described with a Hidden Markov Model (HMM). The microcontroller treats each signal type with a source model, so that the probability of the above source signal states (e.g. off, braking, left indicator, right indicator, hazards, braking+hazards) can be estimated. The likelihood of the braking state is also combined with the calculated braking deceleration from the accelerometer to determine the output level of braking that should be applied.

In an embodiment, the brake controller further includes signal conditioning (either analogue or digital) configured to debounce and to remove Pulse Width Modulation noise from the combined light signals to generate filtered combined light signals. The signal conditioning may be performed by a signal conditioning circuit or by the microcontroller.

In an embodiment, the signal conditioning is further configured to implement at least one Phase-Locked Loop (PLL) (which may be a digital PLL) to perform frequency and phase estimations of the filtered combined light signals. In use, the filtered combined light signals include left and right filtered combined light signals and two PLLs respectively perform the frequency and phase estimations for the left and right signals.

The signal conditioning may be further configured to implement a time gate to output a reset corresponding to resetting estimating a likelihood of one of the source signal states to an estimate of 100% likelihood after a designated time period. In this embodiment, the microcontroller is configured to estimate the likelihood of each of the source signal states based on the Stochastic Model, and the frequency and phase estimations of the filtered combined light signals and the reset from the signal conditioning.

In another embodiment, the signal conditioning is further configured to maintain a histogram of times between rising and falling edges of the filtered combined light signals. In this embodiment, the microcontroller is further configured to estimate of the likelihood of each of the source signal states based on the Stochastic Model and the histogram, and without reference to history beyond the histogram of times.

In an embodiment, the brake controller is mounted to the towed vehicle. Alternatively, the brake controller is mounted to the trailer connector of the towing vehicle.

BRIEF DESCRIPTION OF DRAWINGS

Embodiments of the present invention will now be described with reference to the accompanying drawings, wherein.

DETAILED DESCRIPTION

Figure 1:
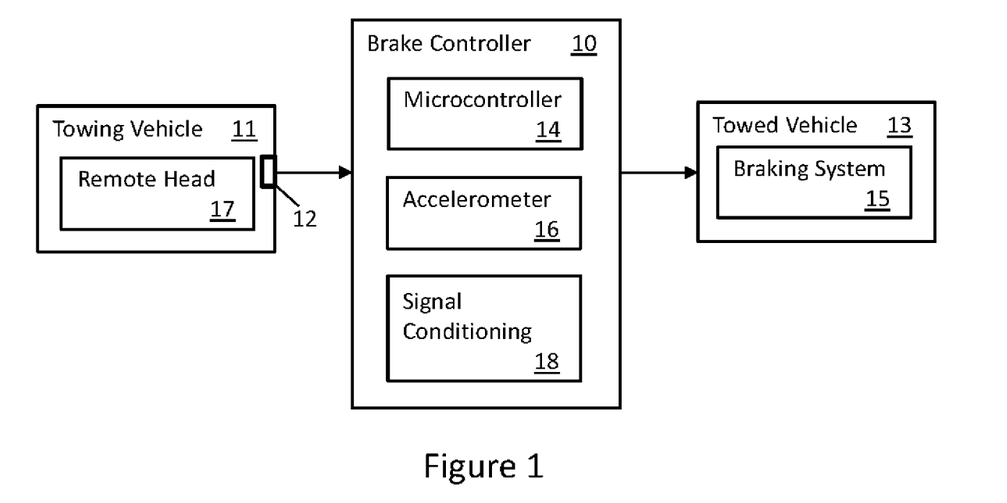
FIG. 1 is a block diagram showing a brake controller for a towed vehicle braking system receiving combined light signals from a towing vehicle, in accordance with an embodiment of the present invention.

FIG. 1 shows a brake controller 10 for a braking system 15 of a towed vehicle 13. The towed vehicle 13 is of the type having combined brake and turn lights which are activated by combined light signals from a towing vehicle 11. As mentioned, many towed vehicles, such as trailers, especially in North America, have combined brake and turn lights, and they receive combined light signals from the towing vehicle 11 via a trailer connector 12. The brake controller 10 may be mounted on the towed vehicle or it may be mounted to the trailer connector 12. In one embodiment, the trailer connector 12 is a 7-pin SAE J2863 trailer connector. As mentioned, the 7-pin SAE J2863 trailer connector does not have a separate pin for a brake signal, and instead has one pin for left combined turn/stop lamp signals and one pin for right combined right turn/stop lamp signals.

The towing vehicle 11 activates the combined brake and turn lights of the towed vehicle 13 to communicate a plurality of source signal states of the towing vehicle 11. These source signal states include: off; left-turn signal state; right-turn signal state; hazard signal state; braking signal state; emergency braking signal state; left-turn and braking signal state; right-turn and braking signal state; left-turn and emergency braking signal state; right-turn and emergency braking signal state; hazard and braking signal state; and hazard and emergency braking signal state. The towing vehicle 11 communicates each of these source signal states to the towed vehicle 13 via left combined turn/stop lamp signals and right combined right turn/stop lamp signals.

The brake controller 10 includes a microcontroller 14 configured to receive the combined light signals from the towing vehicle 11, which in the embodiment are left and right combined right turn/stop lamp signals, and to estimate a likelihood that the towing vehicle 11 is braking based on these combined light signals. That is, the brake controller 10 is configured to determine whether the inputted combined light signals are a valid brake light signal. The microcontroller 14 is further configured to generate a braking control signal to control activation of brakes of the towed vehicle braking system 15 based at least in part on the estimated likelihood that the towing vehicle is braking and there is a valid brake light signal. For example, the microcontroller 14 generates the braking control signal when the estimated likelihood—of the received combined light signals being a valid brake light signal and thus the towing vehicle 11 is braking—is greater than or equal to 90%.

The braking control signal can communicate further information to the braking system 15 of the towed vehicle 13, including an output level that is used to control a braking force to be applied to the brakes of the towed vehicle braking system 15. A user can control the output level by controlling the gain for the braking control signal with a remote head 17 associated with the brake controller 10. The remote head 17 is mounted in the towing vehicle 11, remote from the brake controller 10, and is configured to control the gain for the braking control signal. The remote head 17 may be potentiometer configured to provide gain control or a rotary encoder. Also, the remote head 17 may include other input and output devices so that a user can interface with the brake controller 10, such as a touch screen display or LEDs to display status of the braking system 15.

Figure 3:
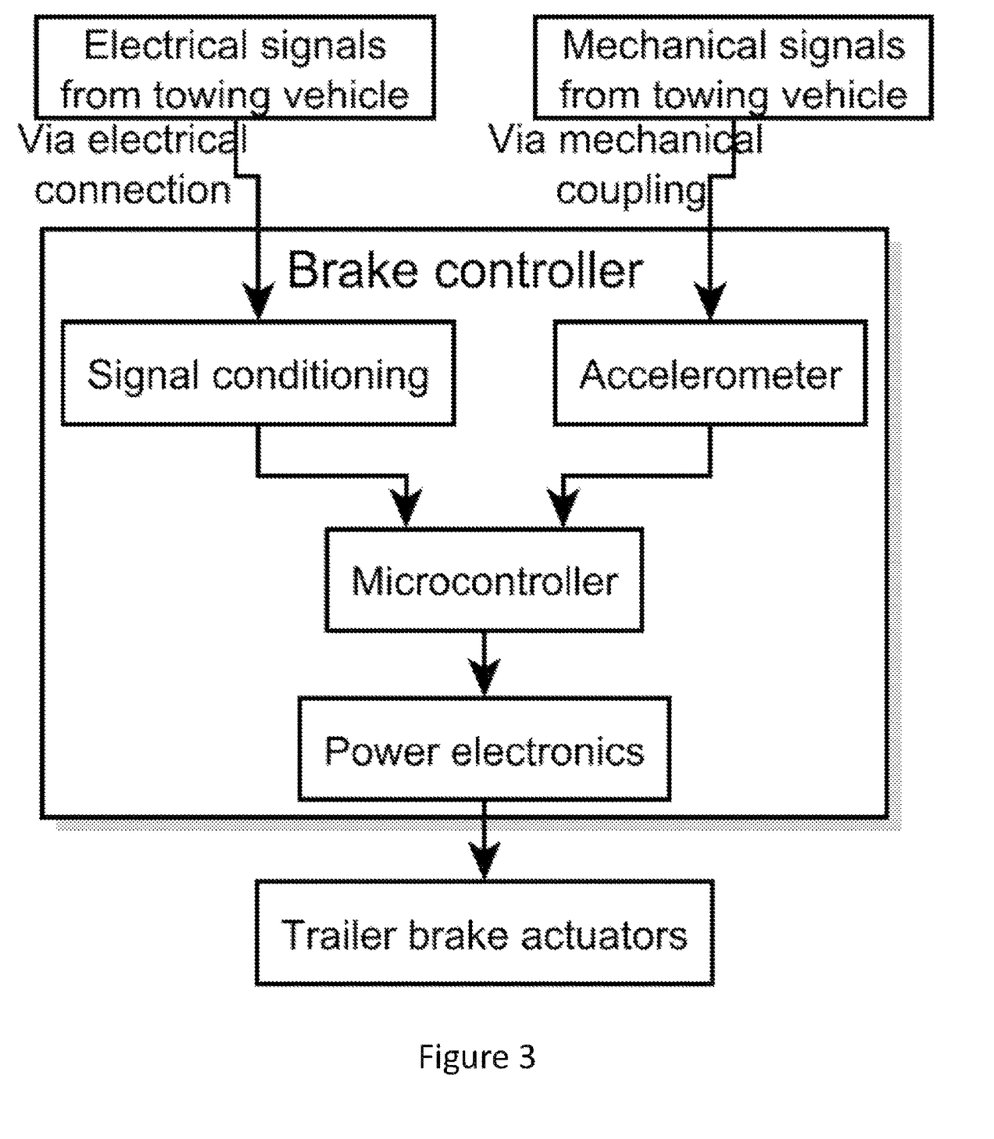
FIG. 3 is a block diagram showing a brake controller for a towed vehicle braking system, in accordance with an embodiment of the present invention.

The brake controller 10 further includes an accelerometer 16 configured to determine deceleration of the vehicle on which it is mounted. The accelerometer 16 is a multi-axis accelerometer for sensing the deceleration of the towing vehicle 11 in multiple directional axes in order to ensure that braking deceleration may be sensed on at least one axis. The microcontroller 14 is thus configured in the embodiment to generate the braking control signal to control activation of the brakes of the towed vehicle braking system 15 based on the estimated likelihood that the towing vehicle is braking and the determined deceleration of the vehicle on which it is mounted. That is, the brake controller 10 generates electrical control signals for the towed vehicle braking system 15 from electrical measurements from the combined light signals and mechanical measurements from the accelerometer 16, as shown in FIG. 3. The electrical control signals will then be amplified by power electronics in the braking system 15 to control the mechanical components of the braking system 15 via suitable electromagnetic, hydraulic or pneumatic actuators. The power electronics may include high-side drivers and commutating diodes in order to drive the electromagnetic actuators, which are commonly highly inductive and require high current.

In addition to the user controlling the braking force to be applied to the brakes of the towed vehicle 13 with the remote head 17, the output level may also be based on the determined deceleration of the vehicle on which it is mounted and the estimated likelihood that the towing vehicle 11 is braking. That is, the level of braking output will be calculated by the microcontroller 14 based on a deceleration estimation derived from the accelerometer 16 measurements as well as a control gain function set by the driver via the remote head 17 and the likelihood that the towing vehicle 11 is in either the braking or emergency braking states.

Figure 2:
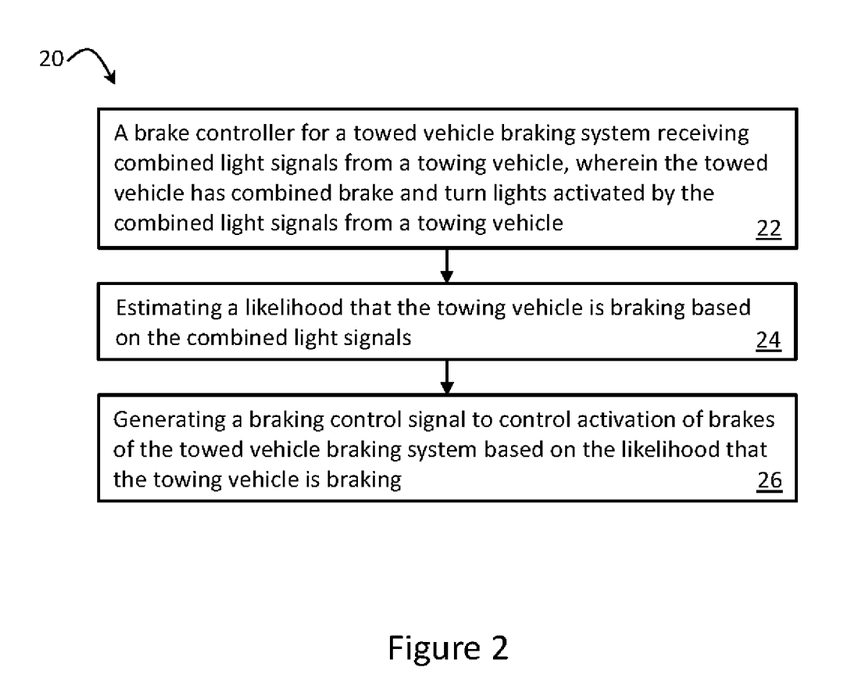
FIG. 2 is a flow chart of a method of operating a brake controller, in accordance with an embodiment of the present invention.

FIG. 2 shows a summary of a method 20 of operating the brake controller 10. The method 20 including the steps of: the brake controller receiving 22 the combined light signals from the towing vehicle; estimating 24 a likelihood that the towing vehicle is braking based on the combined light signals; and generating 26 a braking control signal to control activation of brakes of the towed vehicle braking system based at least in part on the estimated likelihood that the towing vehicle is braking. It will be appreciated by those persons skilled in the art that further aspects of the method will be apparent from the description of the brake controller 10. Further, the persons skilled in the art will also appreciate that at least part of the method 20 could be embodied in program code that is implemented by the microcontroller 14. The program code could be supplied in a number of ways, such as on a memory in data communication with the microcontroller 14. The microcontroller 14 in the embodiment includes a microprocessor that is configured to execute one or more algorithms stored in an associated memory, such as RAM and/or ROM (not shown), to perform the estimation of the likelihood that the towing vehicle 11 is braking based on the received combined light signals of the towing vehicle 11.

Figure 4:
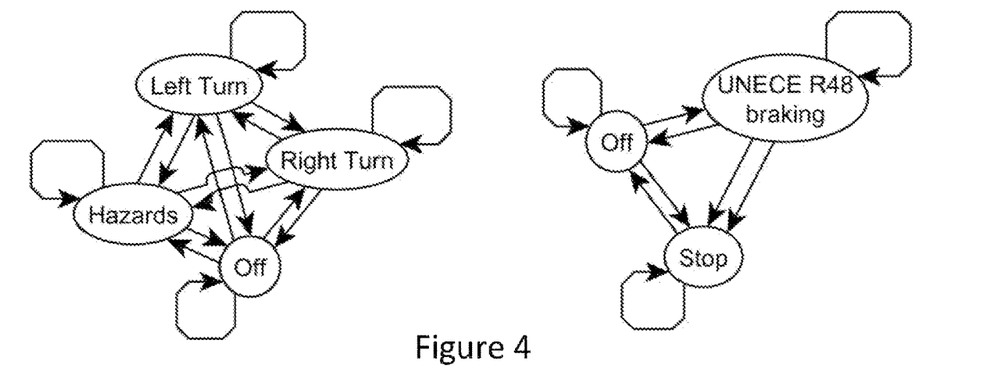
FIG. 4 shows examples of factorised independent states of a towing vehicle.
Figure 5:
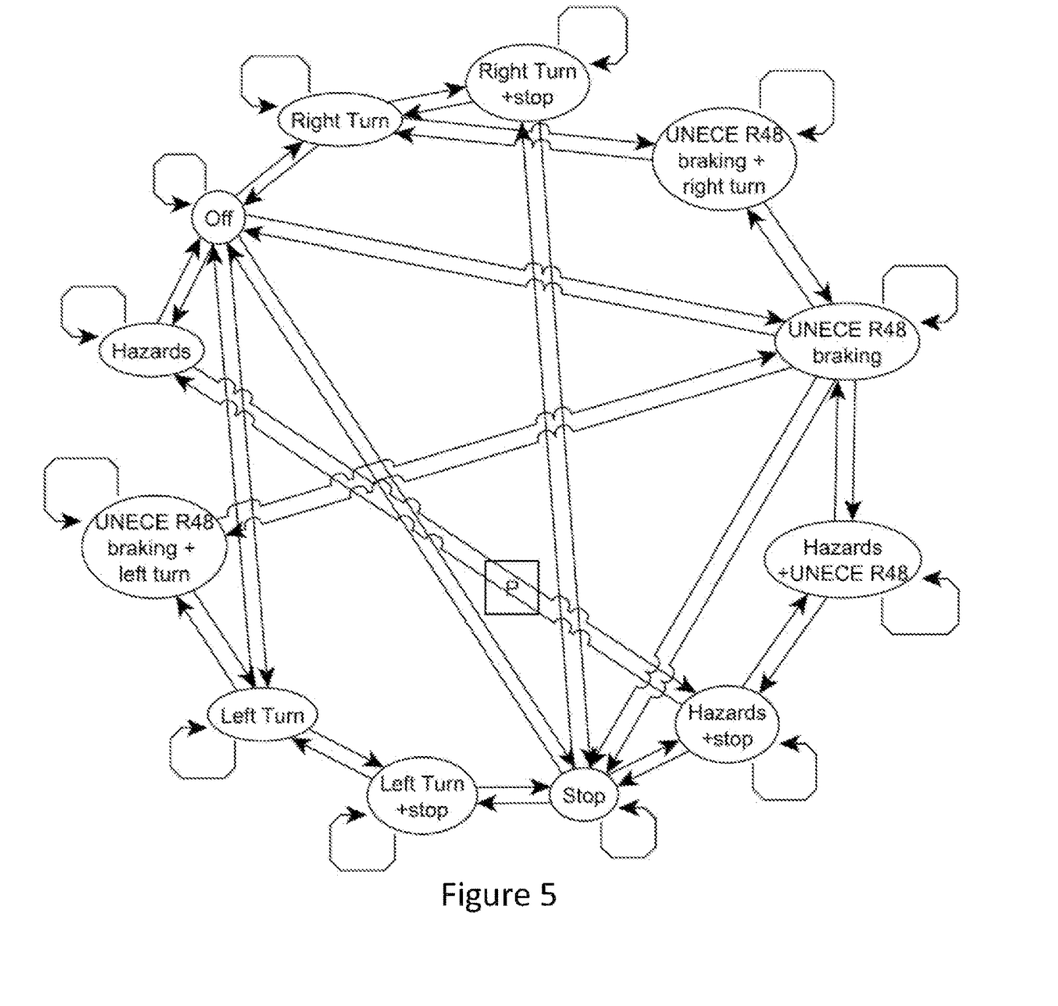
FIG. 5 shows an example of a simplified joint state machine model.
Figure 8:
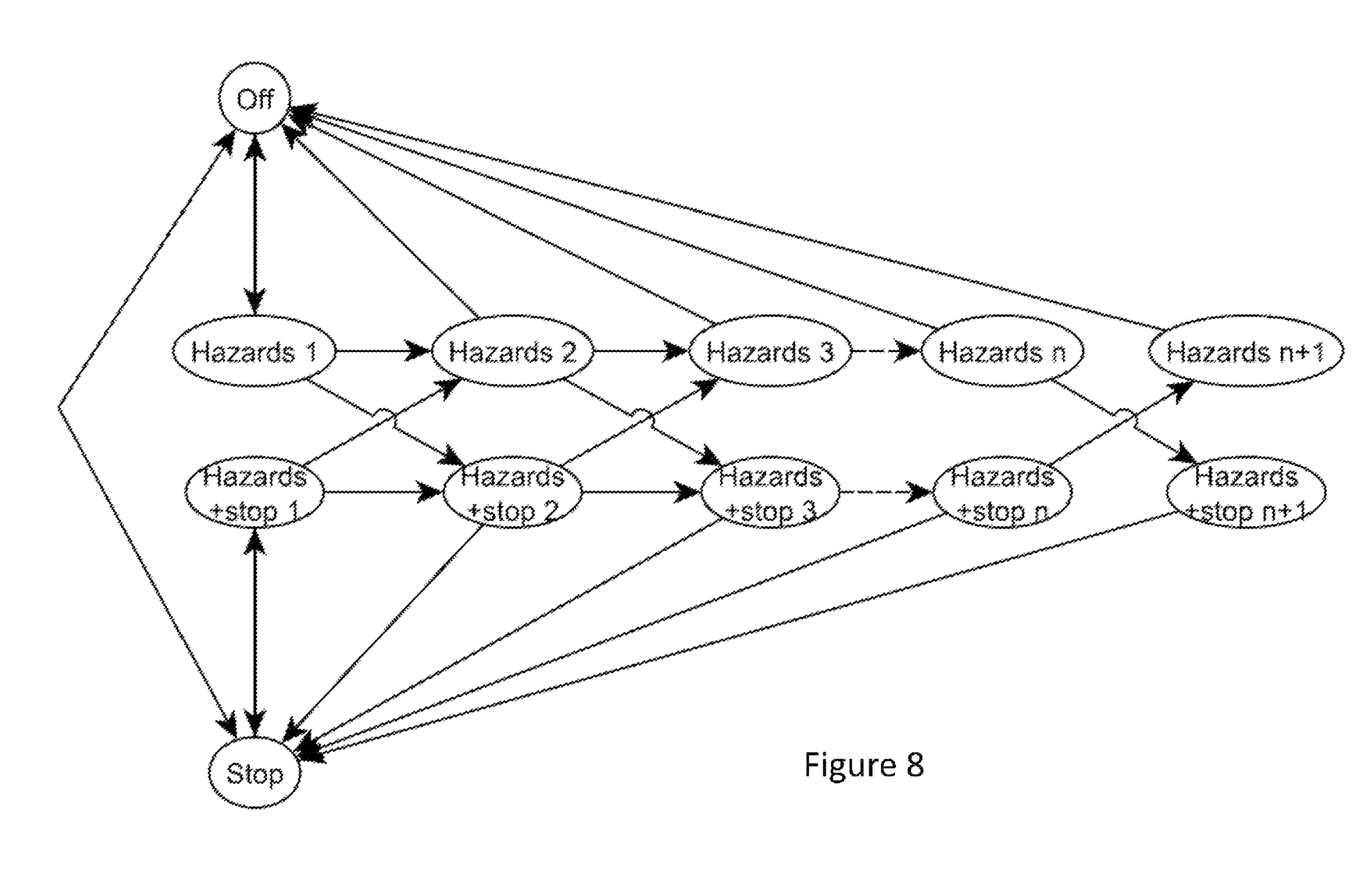
FIG. 8 shows another example of a state machine model.

FIGS. 4, 5 and 8 show state models of the source signal states of the towing vehicle 11, and potential movements between the states. The microcontroller 14 is configured to estimate a likelihood that the towing vehicle 11 is braking by first constructing a Stochastic Model of the source signal states, as exemplified by the state models. The microcontroller 14 estimates the likelihood of each of the source signal states in a state model, and then estimates the likelihood that the towing vehicle is braking based on the likelihood of each of the source signal states.

FIG. 4 shows two partial, independent state models, which are a factorisation of the observable model. The first model shows all the relationships between the source signal states generated as a result of braking: off; hazards; and left-turn. The second model shows all the relationships between the source signal states generated as a result of indication mechanisms: off; stop (i.e. braking); and UNECE R48 braking (i.e. emergency braking). For instance, from the off state (i.e. no combined brake/turn light signals present), the towing vehicle 11 may stay in the off state, or change to a braking state or an emergency braking state.

FIG. 5 shows a simplified joint state machine model, showing all the source signal states of the towing vehicle 11 and their combinations. FIG. 5 only shows some of the movements between the states as it omits those that are considered to be low-probability transitions. For instance, from the off state, the towing vehicle 11 may stay in the off state, change to a hazards state, left-turn state, stop state, UNECE R48 braking state, or right-turn state.

The microcontroller 14 is configured to construct the Stochastic Model for the source signal states as exemplified in the simplified joint state machine model of FIG. 5. As mentioned, these source signal states are communicated to the brake controller 10 and the towed vehicle 13 via left combined turn/stop lamp signals and right combined right turn/stop lamp signals. In an example, the following sources may be active from the following signals:

1. Left turn signal (from 1-2 Hz)
2. Right turn signal (from 1-2 Hz)
3. Hazard signal (both left and right turn intermittently from 1-2 Hz)
4. Braking signal (both lamps on)
5. UNECE Regulation 48 emergency braking signal (both lamps flashing at 3-4 Hz)

Moreover, the trailer connector 12 may be connected to a trailer lighting converter (not shown). In this case, the brake controller 10 is connected to the converter and the combined light signals may be generated by an inversion of the turn (and hazard) signals, or by overriding the turn (and hazard) signals. Due to this, the source state of the signals is not always directly observable from the lamp drive output that is available at the trailer signal connection, e.g. the trailer connector 12. To address this, in one embodiment, the Stochastic Model constructed by the microcontroller 14 is a Hidden Markov Model (HMM). The HMM is used to model the source states and the microcontroller 14 uses the methods shown in the flow charts of FIGS. 6 and 7, respectively, to estimate the likelihood of each of the source signal states.

The first step performed by the brake controller 10 is signal conditioning. The signal conditioning is performed by a signal conditioning circuit 18, in the embodiment shown in FIG. 1, of the brake controller 10, and is configured to debounce and to remove Pulse Width Modulation (PWM) noise from the combined light signals to generate filtered combined light signals. In another embodiment, the signal condition is performed by the microcontroller 14. This could be done using a combination of analogue filtering (for fast glitches) and digital filtering (using a window timer of 1-20 ms) for PWM, resulting in a logical true signal when the light signal is above a mean value of 6V. Identical filtering would be applied to left and right signals, as shown in the flow charts of FIGS. 6 and 7.

Figure 6:
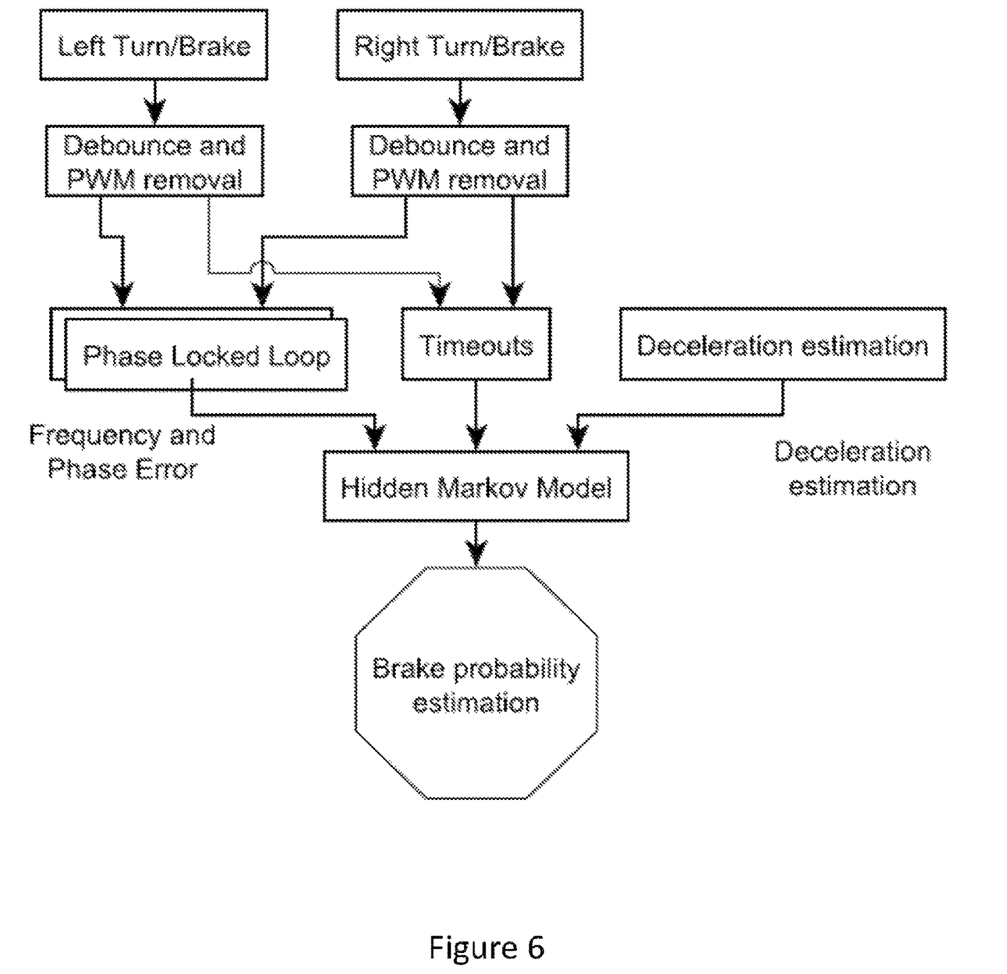
FIG. 6 shows a flow chart of a method of estimating a likelihood that the towing vehicle is braking in accordance with an embodiment of the present invention.

After this step, as shown in the flow graph embodiment of FIG. 6, the signal conditioning circuit 18 is further configured to implement a time gate (labelled Timeouts) to output a reset corresponding to resetting estimating a likelihood of one of the source signal states to an estimate of 100% likelihood after a designated time period. That is, the time gate can be used to reset state estimation to 100% confidence in the following states:

Off: both signals low for more than 1 s

Stop: both signals high for more than 1 s

Left turn and right turn: One signal low for more than 1 s

Left turn with brake and right turn with brake: One signal high for more than 1 s Also, in parallel with the time gate, is a pair of digital phase-locked loops (PLLs). The PLLs are implemented to perform frequency and phase estimations on the left and right filtered combined light signals. As the signal is required for operation of a safety device, i.e. brakes, minimum lock time is required. Therefore, the frequency and phase will be initialised from direct measurements on the rising and falling edge times of the first cycle of each signal. After this initial measurement, the frequency and phase will be tracked using an error filter. If an edge occurs outside of the tracking window of the filter, a new filter instance will be created to run in parallel. If both filters have the same frequency after some period of time (e.g. 2 cycles in a preferred implementation), then the second filter will be removed; otherwise, it will replace the first filter. The estimated frequency and the phase of each transition will be outputs of this stage.

In the embodiments, a deceleration determination is used as an additional input to the HMM. This will be an estimation of the absolute forward acceleration, which may be understood by those persons skilled in the art to be derivable by many methods using the accelerometer 16.

The microcontroller 14 receives signals from the PLLs, Timeouts, and deceleration estimation, and constructs the HMM for the source signal states. The microcontroller 14 then estimates the likelihood of each of the source signal states based on the HMM. The microcontroller 14 uses the Forward Algorithm to estimate the hidden state of the brake light source signal based on transition and emission matrices as shown below. For ease of modelling, a pseudo-state P is added to handle simultaneous phase steps in both PLL outputs.

TABLE 1

Estimated Transition Matrix for Joint State Model

| Joint source | Joint Dest | | | | | | | | | | | | |
|---|---|---|---|---|---|---|---|---|---|---|---|---|---|
| | Off/ off | Off/ left turn | Off/ right turn | Off/ hazards | Stop/ off | UNECE/ off | Stop/ left turn | Stop/ right turn | Stop/ hazards | UNECE/ left turn | UNECE/ right turn | UNECE/ hazards | P |
| Off/off | 0.92569 | 0.02 | 0.02 | 0.001 | 0.03 | 0.001 | 0.001 | 0.001 | 0.0001 | 0.0001 | 0.0001 | 0.00001 | 0 |
| Off/left turn | 0.03866 | 0.85 | 0.01 | 0.001 | 0.0001 | 0.0001 | 0.1 | 0.00001 | 0.00001 | 0.0001 | 0.00001 | 0.00001 | 0 |
| Off/right turn | 0.03866 | 0.01 | 0.85 | 0.001 | 0.0001 | 0.0001 | 0.00001 | 0.1 | 0.00001 | 0.00001 | 0.0001 | 0.00001 | 0 |
| Off/hazards | 0.00992 | 0.00001 | 0.00001 | 0.8 | 0.00001 | 0.00001 | 0.00001 | 0.00001 | 0.1 | 0.00001 | 0.00001 | 0.01 | 0.08 |
| Stop/off | 0.04858 | 0.0001 | 0.0001 | 0.00001 | 0.9 | 0.03 | 0.01 | 0.01 | 0.001 | 0.0001 | 0.0001 | 0.00001 | 0 |
| UNECE/off | 0.01793 | 0.00001 | 0.00001 | 0.00001 | 0.01 | 0.7 | 0.00001 | 0.00001 | 0.00001 | 0.001 | 0.001 | 0.00001 | 0.27 |
| Stop/left turn | 0.00876 | 0.12 | 0.0001 | 0.0001 | 0.11 | 0.00001 | 0.75 | 0.001 | 0.00001 | 0.01 | 0.00001 | 0.00001 | 0 |
| Stop/right turn | 0.00876 | 0.0001 | 0.12 | 0.0001 | 0.11 | 0.00001 | 0.001 | 0.75 | 0.00001 | 0.00001 | 0.01 | 0.00001 | 0 |
| Stop/hazards | 0.00975 | 0.00001 | 0.00001 | 0.05 | 0.05 | 0.00001 | 0.0001 | 0.0001 | 0.74 | 0.00001 | 0.00001 | 0.05 | 0.1 |
| UNECE/left turn | 0.04794 | 0.1 | 0.00001 | 0.00001 | 0.001 | 0.001 | 0.3 | 0.00001 | 0.00001 | 0.5 | 0.00001 | 0.00001 | 0.05 |
| UNECE/right turn | 0.04794 | 0.00001 | 0.1 | 0.00001 | 0.001 | 0.001 | 0.00001 | 0.3 | 0.00001 | 0.00001 | 0.5 | 0.00001 | 0.05 |
| UNECE/hazards | 0.04794 | 0.00001 | 0.00001 | 0.1 | 0.001 | 0.001 | 0.00001 | 0.00001 | 0.1 | 0.00001 | 0.00001 | 0.7 | 0.05 |
| P | 0.125 | 0.01 | 0.01 | 0.1 | 0.25 | 0.25 | 0.001 | 0.001 | 0.25 | 0.001 | 0.001 | 0.001 | 0 |

The emission events are:
1 s high on left
1 s high on right
1 s high on both
1 s low on left
1 s low on right
1 s low on both
1 Hz<PLL frequency<3 Hz
3 Hz<PLL frequency<4 Hz
PLL left/right phase synchronised
PLL left/right phase reversed
PLL phase change (lock loss)

In one embodiment, the accelerometer value is another emission from the unknown state machine (via brake force), and the following state outputs are used:
>0.05 g braking deceleration
<0.05 g braking deceleration The likelihood of two types of emission output may be combined by multiplication.

In an alternative embodiment, a Gaussian emission model may be used for this output, and for the PLL frequency.

Using these matrices, the Forward Algorithm may be used to estimate likelihood distribution of the current state.

In another embodiment, the same glitch removal is used, but the timeout method and PLL are incorporated into a HMM with emission probabilities dependent on state history. This may be modelled by adding pseudo-states for timesteps of the left/right turn signals as simplified in FIG. 8. In this case, since the state machine is not finite, the state estimations require management to prune old states from the model.

Figure 7:
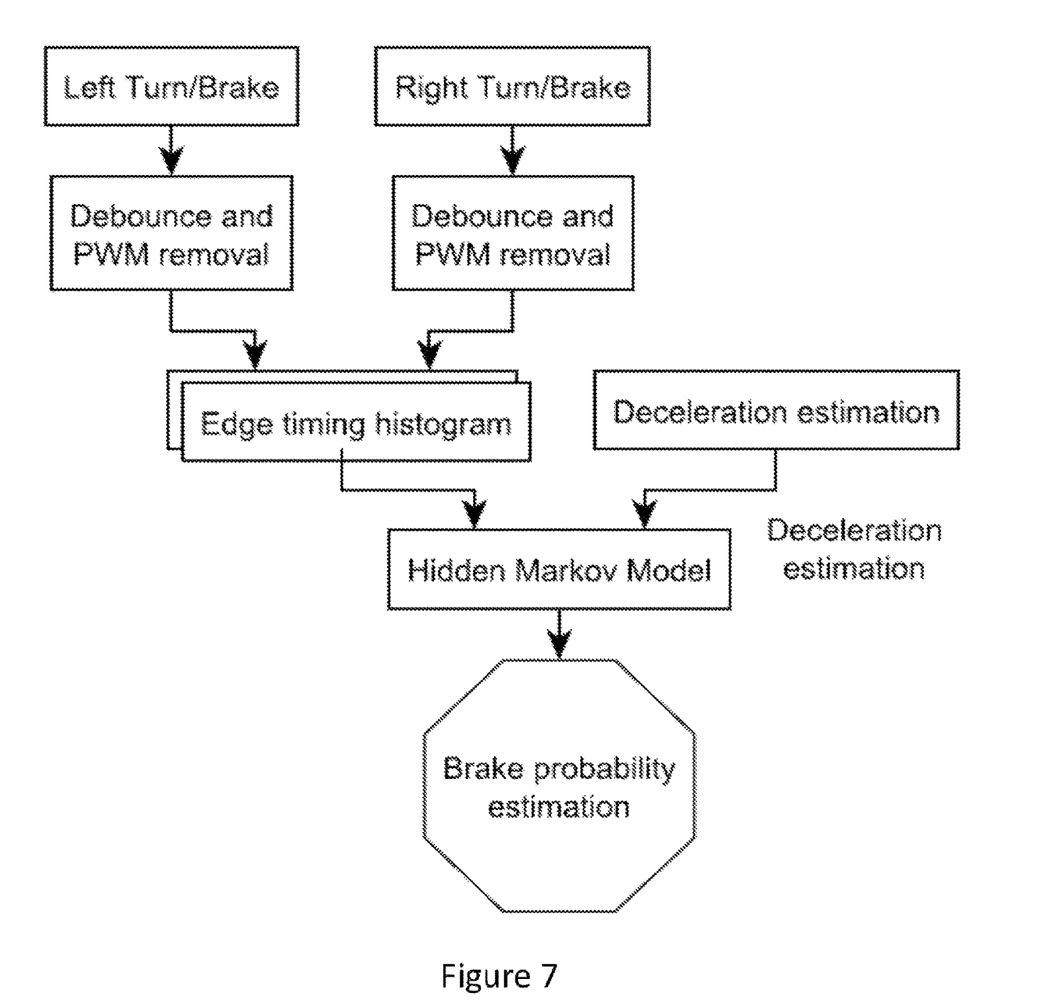
FIG. 7 shows a flow chart of a method of estimating a likelihood that the towing vehicle is braking in accordance with another embodiment of the present invention.

In another embodiment, the HMM is modelled using the flow graph of FIG. 7 and the state machine of FIG. 5 but without the temporary state P. In this embodiment, each transition of the left and right stop/turn signals is given a timestamp and stored in a circular buffer, which may have a maximum length of 6 entries and may be limited to 3 s length. The current state of the signal is also stored. On a regular basis, which may be 100 ms period, each circular buffer is processed to produce a histogram of times between combinations of edges as follows:

TABLE 2

Estimated Emission Matrix for Joint State Model

| Source state | Emission type | | | | | | | | | | | | |
|---|---|---|---|---|---|---|---|---|---|---|---|---|---|
| | 1 s high on left | 1 s high on right | 1 s high on both | 1 s low on left | 1 s low on right | 1 s low on both | 0.8 Hz < PLL frequency < 3 Hz | 3 Hz < PLL frequency < 4 Hz | PLL left/right synch | PLL left/right phase reversed | >0.05 g braking deceleration | <0.05 g braking deceleration | Sync glitch |
| Off/off | 0 | 0 | 0 | 0 | 0 | 0.99 | 0 | 0 | 0 | 0 | 0.1 | 0.9 | 0.0001 |
| Off/left turn | 0 | 0.001 | 0 | 0 | 0.99 | 0 | 0.9 | 0 | 0 | 0 | 0.1 | 0.9 | 0.0001 |
| Off/right turn | 0.001 | 0 | 0 | 0.99 | 0 | 0 | 0.9 | 0 | 0 | 0 | 0.1 | 0.9 | 0.0001 |
| Off/hazards | 0 | 0 | 0 | 0 | 0 | 0 | 0.9 | 0.01 | 0.9 | 0.01 | 0.1 | 0.9 | 0.0001 |
| Stop/off | 0 | 0 | 0.99 | 0 | 0 | 0 | 0 | 0 | 0 | 0 | 0.5 | 0.5 | 0.0001 |
| UNECE/off | 0 | 0 | 0 | 0 | 0 | 0 | 0.01 | 0.9 | 0.9 | 0.01 | 0.7 | 0.3 | 0.0001 |
| Stop/left turn | 0 | 0.99 | 0 | 0 | 0 | 0 | 0 | 0 | 0 | 0 | 0.5 | 0.5 | 0.0001 |
| Stop/right turn | 0.99 | 0 | 0 | 0 | 0 | 0 | 0 | 0 | 0 | 0 | 0.5 | 0.5 | 0.0001 |
| Stop/hazards | 0 | 0 | 0 | 0 | 0 | 0 | 0.9 | 0 | 0.9 | 0.01 | 0.5 | 0.5 | 0.0001 |
| UNECE/left turn | 0 | 0 | 0 | 0 | 0 | 0 | 0.01 | 0.9 | 0.01 | 0.9 | 0.7 | 0.3 | 0.0001 |
| UNECE/right turn | 0 | 0 | 0 | 0 | 0 | 0 | 0.01 | 0.9 | 0.01 | 0.9 | 0.7 | 0.3 | 0.0001 |
| UNECE/hazards | 0 | 0 | 0 | 0 | 0 | 0 | 0.01 | 0.9 | 0.5 | 0.5 | 0.7 | 0.3 | 0.0001 |
| P | 0 | 0 | 0 | 0 | 0 | 0 | 0 | 0 | 0 | 0 | 0 | 0 | 1 |

```
For each edge from newest to second-oldest,
  set time x=timestamp of edge
  For each other edge that is older,
    set time y=timestamp of older edge
    put z=x-y into histogram
```

The histogram bins are:

1. 0-100 ms
2. 100-400 ms
3. 400-1100 ms
4. >1100 ms

The combined set of timestamps from the two channels will also be used to generate a third histogram.

Each histogram will then emit a label according to the table below, using the notation of Nx for the number in each histogram bin.

TABLE 3

| Histogram Interpretation | | |
|---|---|---|
| Condition | Label | Description |
| N2 > 0 && N3 < N2/2.3 | L1 | >=4 Hz (UNECE R48 flashing) |
| N2 > 0 && N3 > N2/2.3 | L2 | Combination of signals |
| N2 = 0 && N3 > 0 | L3 | Indicator/hazard only |
| N2 = 0 && N3 = 0 && light on && last event > 0.6 s old | L4 | Fixed on (brake) |
| N2 = 0 && N3 = 0 && light off && last event > 0.6 s old | L5 | Fixed off |
| N2 = 0 && N3 = 0 && light on && last event < 0.6 s old | L6 | turn-on |
| N2 = 0 && N3 = 0 && light off && last event < 0.6 s old | L7 | turn-off |

Furthermore, a histogram may be similarly generated from the differences between the two channels. This histogram may have an additional bin for values from 0-5 ms. A high value in this bin is indicative of synchronized lighting on the two channels, which will arise from braking, UNECE R48 flashing, or hazard flashing.

The labels from the two channels will then be combined to make a final label according to the table below. If the combined channel histogram is generated, and the value in the 0-5 ms bin is >4, then the table may be changed.

TABLE 4

| Histogram Channel Combination | | | | | | | |
|---|---|---|---|---|---|---|---|
| | Right | | | | | | |
| Left | L1 | L2 | L3 | L4 | L5 | L6 | L7 |
| L1 | C1 | C2 | C2 | C12 | C12 | C12 | C12 |
| L2 | C3 | C4 | C2 | C12 | C12 | C12 | C12 |
| L3 | C3 | C3 | C5 | C9 | C8 | C13 | C13 |
| L4 | C12 | C12 | C7 | C10 | C10 | C14 | C10 |
| L5 | C12 | C12 | C6 | C10 | C11 | C6 | C6 |
| L6 | C12 | C12 | C15 | C16 | C8 | C17 | C10 |
| L7 | C12 | C12 | C15 | C10 | C8 | C10 | C11 |

In this case, the transition and emission probability tables are modified as given below. As for the previous model, emission probabilities for the lighting states (C1-C17) and the deceleration states may be combined using multiplication:

TABLE 5

| Estimated Transition Matrix for Simplified Joint State Model | | | | | | | | | | | | |
|---|---|---|---|---|---|---|---|---|---|---|---|---|
| | Joint Dest | | | | | | | | | | | |
| Joint source | Off/ off | Off/ left turn | Off/ right turn | Off/ hazards | Stop/ off | UNECE/ off | Stop/ left turn | Stop/ right turn | Stop/ hazards | UNECE/ left turn | UNECE/ right turn | UNECE/ hazards |
| Off/off | 0.92569 | 0.02 | 0.02 | 0.001 | 0.03 | 0.001 | 0.001 | 0.001 | 0.0001 | 0.0001 | 0.0001 | 0.00001 |
| Off/left turn | 0.03866 | 0.85 | 0.01 | 0.001 | 0.0001 | 0.0001 | 0.1 | 0.00001 | 0.00001 | 0.0001 | 0.00001 | 0.00001 |
| Off/right turn | 0.03866 | 0.01 | 0.85 | 0.001 | 0.0001 | 0.0001 | 0.00001 | 0.1 | 0.00001 | 0.00001 | 0.0001 | 0.00001 |
| Off/hazards | 0.08992 | 0.00001 | 0.00001 | 0.8 | 0.00001 | 0.00001 | 0.00001 | 0.00001 | 0.1 | 0.00001 | 0.00001 | 0.01 |
| Stop/off | 0.04858 | 0.0001 | 0.0001 | 0.00001 | 0.9 | 0.03 | 0.01 | 0.01 | 0.001 | 0.0001 | 0.0001 | 0.00001 |
| UNECE/off | 0.28793 | 0.00001 | 0.00001 | 0.00001 | 0.01 | 0.7 | 0.00001 | 0.00001 | 0.00001 | 0.001 | 0.001 | 0.00001 |
| Stop/left turn | 0.00876 | 0.12 | 0.0001 | 0.0001 | 0.11 | 0.00001 | 0.75 | 0.001 | 0.00001 | 0.01 | 0.00001 | 0.00001 |
| Stop/right turn | 0.00876 | 0.0001 | 0.12 | 0.0001 | 0.11 | 0.00001 | 0.001 | 0.75 | 0.00001 | 0.00001 | 0.01 | 0.00001 |
| Stop/hazards | 0.10975 | 0.00001 | 0.00001 | 0.05 | 0.05 | 0.00001 | 0.0001 | 0.0001 | 0.74 | 0.00001 | 0.00001 | 0.05 |
| UNECE/left turn | 0.09794 | 0.1 | 0.00001 | 0.00001 | 0.001 | 0.001 | 0.3 | 0.00001 | 0.00001 | 0.5 | 0.00001 | 0.00001 |
| UNECE/right turn | 0.09794 | 0.00001 | 0.1 | 0.00001 | 0.001 | 0.001 | 0.00001 | 0.3 | 0.00001 | 0.00001 | 0.5 | 0.00001 |
| UNECE/hazards | 0.09794 | 0.00001 | 0.00001 | 0.1 | 0.001 | 0.001 | 0.00001 | 0.00001 | 0.1 | 0.00001 | 0.00001 | 0.7 |

TABLE 6

| Estimated Emission Matrix for Histogram input | | | | | | | | | | | | | | | | | | |
|---|---|---|---|---|---|---|---|---|---|---|---|---|---|---|---|---|---|---|
| | Emission type | | | | | | | | | | | | | | | | | |
| Source state | C1 | C2 | C3 | C4 | C5 | C6 | C7 | C8 | C9 | C10 | C11 | C12 | C13 | C14 | C15 | C16 | C17 | >0.05 g braking deceler-ation | <0.05 g braking deceler-ation |
| Off/off | 0 | 0 | 0 | 0 | 0 | 0 | 0 | 0 | 0 | 0 | 0.99 | 0 | 0 | 0 | 0 | 0 | 0 | 0.1 | 0.9 |
| Off/left turn | 0 | 0 | 0 | 0 | 0 | 0 | 0 | 0.99 | 0 | 0 | 0 | 0 | 0 | 0 | 0 | 0.001 | 0 | 0.1 | 0.9 |
| Off/right turn | 0 | 0 | 0 | 0 | 0 | 0.99 | 0 | 0 | 0 | 0 | 0 | 0 | 0.001 | 0.001 | 0 | 0 | 0 | 0.1 | 0.9 |
| Off/hazards | 0 | 0 | 0 | 0 | 0.99 | 0 | 0 | 0 | 0 | 0 | 0 | 0 | 0 | 0 | 0 | 0 | 0.001 | 0.1 | 0.9 |
| Stop/off | 0 | 0 | 0 | 0 | 0 | 0 | 0 | 0 | 0 | 0.99 | 0 | 0.01 | 0.001 | 0.001 | 0 | 0.001 | 0.001 | 0.5 | 0.5 |

TABLE 6-continued

Estimated Emission Matrix for Histogram input

| | Emission type | | | | | | | | | | | | | | | | | | |
|---|---|---|---|---|---|---|---|---|---|---|---|---|---|---|---|---|---|---|---|
| Source state | C1 | C2 | C3 | C4 | C5 | C6 | C7 | C8 | C9 | C10 | C11 | C12 | C13 | C14 | C15 | C16 | C17 | >0.05 g braking deceleration | <0.05 g braking deceleration |
| UNECE/off | 0.99 | 0 | 0 | 0 | 0 | 0 | 0 | 0 | 0 | 0 | 0 | 0.01 | 0.001 | 0 | 0 | 0 | 0 | 0.7 | 0.3 |
| Stop/left turn | 0 | 0 | 0 | 0 | 0 | 0 | 0 | 0 | 0.9 | 0 | 0 | 0 | 0 | 0 | 0 | 0 | 0 | 0.5 | 0.5 |
| Stop/right turn | 0 | 0 | 0 | 0 | 0 | 0 | 0.9 | 0 | 0 | 0 | 0 | 0 | 0 | 0 | 0 | 0 | 0 | 0.5 | 0.5 |
| Stop/hazards | 0 | 0 | 0 | 0 | 0.99 | 0 | 0 | 0 | 0 | 0 | 0 | 0 | 0 | 0 | 0 | 0 | 0 | 0.5 | 0.5 |
| UNECE/left turn | 0.05 | 0 | 0.8 | 0 | 0.05 | 0 | 0 | 0 | 0 | 0 | 0 | 0 | 0.002 | 0.002 | 0.05 | 0.002 | 0 | 0.7 | 0.3 |
| UNECE/right turn | 0.05 | 0.8 | 0 | 0 | 0.05 | 0 | 0 | 0 | 0 | 0 | 0 | 0 | 0.002 | 0.001 | 0.05 | 0.002 | 0 | 0.7 | 0.3 |
| UNECE/hazards | 0.05 | 0 | 0 | 0.86 | 0 | 0 | 0 | 0 | 0 | 0 | 0 | 0 | 0.001 | 0 | 0.03 | 0 | 0.002 | 0.7 | 0.3 |

In another embodiment, the HMM is modelled using either of the signal flow methods from above, but with a factorial HMM instead of the joint state machine model of FIG. 5.

Another possible embodiment has the HMM replaced with an artificial neural net (ANN), such as a Long/Short Term Memory (LSTM) model trained on a dataset created either from real-world testing, or from a generative model, and fed by the two combined light signals, producing a categorisation of the input signal into the relevant states. The required generative model would be required to simulate the state machines of FIG. 4, with timing parameters uniformly distributed across the configuration space (i.e. the UNECE on/off time (3-4 Hz), indicator on/off time (0.5-2 Hz), hazard on/off time (0.5-2 Hz), time between events (0-1000 s), and likely time spent in states (1% braking, 1% indicator, 0.01% UNECE, 0.01% hazard). For each of the combination of source states described above, a separate instance would be trained, with the logical signal states from the generative model being fed through a simulation of the circuit. The final product would then be able to select between the two instances either by a per-vehicle configuration, or by a confidence output from the ANN. Alternatively, the ANN may be trained with data from real vehicle operation.

The output of the HMM will be an estimate for the probability of either the stop or UNECE R48 states. For the ANN, the output may be a score for the likelihood of being in either state, or for each state independently. This combination of these two state estimates (e.g. their sum, or the inverse log-likelihood ratio of remaining states) will be used to control the braking output.

In an embodiment, the braking estimate will be multiplied by this state probability, so that a high confidence that the stop lights are in use will result in near full braking output, while a low confidence will result in a low braking output.

In an alternative embodiment, a threshold will be applied to the state probability, so that a high confidence that the stop lights are in use will result in full braking output, while a low confidence will result in no braking output.

Finally, it is to be understood that various alterations, modifications and/or additions may be introduced into the constructions and arrangements of parts previously described without departing from the spirit or ambit of the invention.

The invention claimed is:

1. A brake controller for a towed vehicle braking system, wherein the towed vehicle has combined brake and turn lights activated by combined light signals from a towing vehicle, the brake controller including:

a microcontroller configured to:
receive the combined light signals from the towing vehicle, wherein the combined light signals received from the towing vehicle are analog signals that represented combined brake and turn light signals; and
estimate a likelihood that the towing vehicle is braking based on the combined light signals,
wherein the microcontroller is further configured to generate a braking control signal to control activation of brakes of the towed vehicle braking system based on at least in part the estimated likelihood that the towing vehicle is braking.

2. The brake controller of claim 1, further including an accelerometer configured to determine deceleration of the towed or towing vehicle, and the braking control signal is based on the deceleration of the towed or towing vehicle and the likelihood that the towing vehicle is braking.

3. The brake controller of claim 2, wherein the braking control signal includes an output level used to control braking force of the brakes of the towed vehicle.

4. The brake controller of claim 3, wherein the output level is based on the deceleration of the towed or towing vehicle.

5. The brake controller of claim 4, wherein the output level is further based on gain for the braking control signal.

6. The brake controller of claim 5, wherein the brake controller is associated with a remote head mounted in the towing vehicle remote from the brake controller for controlling the gain for the braking control signal.

7. The brake controller of claim 2, wherein the output level is based on the likelihood that the towing vehicle is braking.

8. The brake controller of claim 7, wherein the output level used to control a full braking force of the brakes of the towed vehicle is not applied when the likelihood that the towing vehicle is braking is below a threshold likelihood.

9. The brake controller of claim 8, wherein the output level is reduced from the output level used to control a full braking force of the brakes of the towed vehicle as the likelihood that the towing vehicle is braking reduces below the threshold likelihood.

10. The brake controller of claim 1, wherein the microcontroller is further configured to: construct a Stochastic Model for a plurality of source signal states; estimate a likelihood of each of the source signal states based on the Stochastic Model and the combined light signals; and estimate the likelihood that the towing vehicle is braking based on the likelihood of each of the source signal states, wherein the plurality of source signal states include one of or a combination of: left-turn signal state; right-turn signal state; hazard signal state; braking signal state; and emergency braking signal state.

11. The brake controller of claim 10, wherein the Stochastic Model is a Hidden Markov Model.

12. The brake controller of claim 1, wherein the microcontroller is further configured to: construct an Artificial Neural Network (ANN) for a plurality of source signal states; estimate a likelihood of each of the source signal states based on the ANN processing the combined light signals; and estimate the likelihood that the towing vehicle is braking based on the likelihood of the source signal states, wherein the plurality of source signal states include one of or a combination of: left-turn signal state; right-turn signal state; hazard signal state; braking signal state; and emergency braking signal state.

13. The brake controller of claim 10, wherein the microcontroller is configured to estimate the likelihood that the towing vehicle is braking based on the likelihood of the combined light signals being generated from at least the braking signal state and or the emergency braking signal state.

14. The brake controller of claim 10, further including an accelerometer configured to determine deceleration of the towed or towing vehicle, and the braking control signal is based on the deceleration of the towed or towing vehicle and the likelihood that the towing vehicle is braking, wherein the microcontroller is further configured to estimate the likelihood that the towing vehicle is braking based on the deceleration of the towed or towing vehicle.

15. The brake controller of claim 14, further including signal conditioning configured to debounce and to remove Pulse Width Modulation noise from the combined light signals to generate filtered combined light signals.

16. The brake controller of claim 15, wherein the signal conditioning is further configured to implement at least one Phase-Locked Loop (PLL) to perform frequency and phase estimations of the filtered combined light signals.

17. The brake controller of claim 16, wherein the signal conditioning is further configured to implement a time gate to output a reset corresponding to resetting estimating a likelihood of one of the source signal states to an estimate of 100% likelihood after a designated time period.

18. The brake controller of claim 17, wherein the microcontroller is configured to estimate the likelihood of each of the source signal states based on the Stochastic Model, and the frequency and phase estimations of the filtered combined light signals and the reset from the signal conditioning.

19. The brake controller of claim 18, wherein the signal conditioning is further configured to maintain a histogram of times between rising and falling edges of the filtered combined light signals.

20. The brake controller of claim 19, wherein the microcontroller is further configured to estimate of the likelihood of each of the source signal states based on the Stochastic Model and the histogram, and without reference to history beyond the histogram of times.

21. The brake controller of claim 1, wherein the microcontroller is configured to receive the combined light signals from a trailer connector on the towing vehicle.

22. The brake controller of claim 21, wherein the trailer connector is a 7-pin trailer connector.

23. The brake controller of claim 21, wherein the brake controller is mounted to the towed vehicle.

24. The brake controller of claim 21, wherein the brake controller is mounted to the trailer connector of the towing vehicle.

25. A method of operating a brake controller for a towed vehicle braking system, wherein the towed vehicle has combined brake and turn lights activated by combined light signals from a towing vehicle, the method including:
 the brake controller receiving the combined light signals from the towing vehicle, wherein the combined light signals received from the towing vehicle are analog signals that represented combined brake and turn light signals;
 estimating a likelihood that the towing vehicle is braking based on the combined light signals; and
 generating a braking control signal to control activation of brakes of the towed vehicle braking system based on at least in part the estimated likelihood that the towing vehicle is braking.

* * * * *